No. 745,739. PATENTED DEC. 1, 1903.
C. RASMUSSEN.
CONVEYER.
APPLICATION FILED AUG. 6, 1903.
NO MODEL.
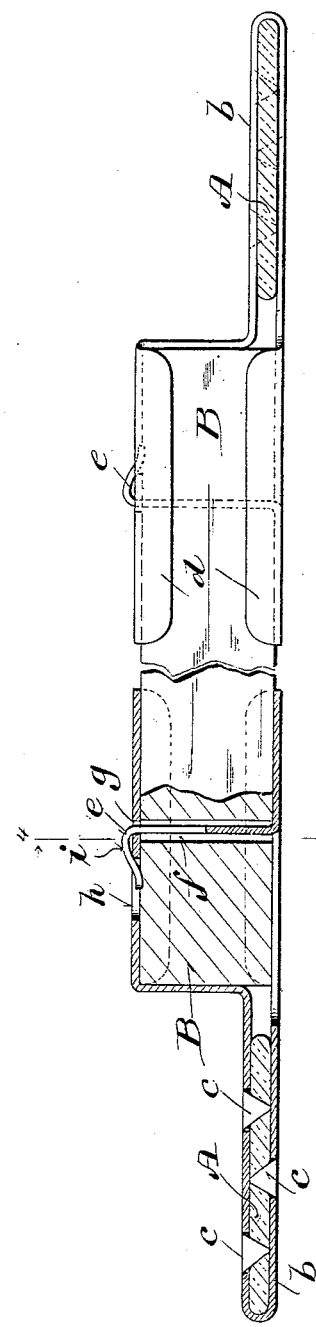
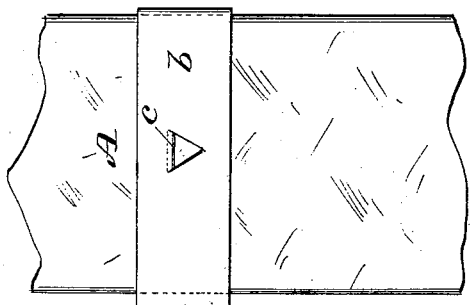
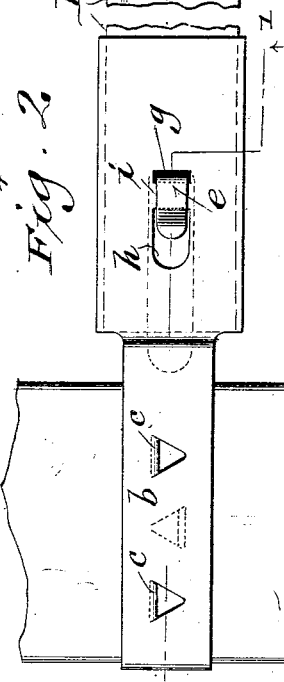
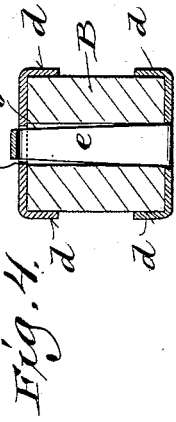
Witnesses:
Geo. W. Young.
N. E. Oliphant.
Inventor
Charles Rasmussen.
By H. G. Underwood
Attorney No. 745,739. Patented December 1, 1903.

UNITED STATES PATENT OFFICE.

CHARLES RASMUSSEN, OF RACINE, WISCONSIN.

CONVEYER.

SPECIFICATION forming part of Letters Patent No. 745,739, dated December 1, 1903.

Application filed August 6, 1903. Serial No. 168,455. (No model.)

*To all whom it may concern:*

Be it known that I, CHARLES RASMUSSEN, a citizen of the United States, and a resident of Racine, in the county of Racine and State of Wisconsin, have invented certain new and useful Improvements in Conveyers; and I do hereby declare that the following is a full, clear, and exact description thereof.

My invention has for its object to economically connect belts and slats of endless conveyers; and it consists in clips similar to what is hereinafter particularly set forth with reference to the accompanying drawings and subsequently claimed.

Figure 1 of the drawings represents a transverse sectional view of a fragment of an endless belt-and-slat conveyer embodying clips in accordance with my invention, this view being partly indicated by lines 1 1 in the second figure; Fig. 2, a plan view of a fragment of the conveyer; Fig. 3, a similar view of the same inverted, and Fig. 4 a detail sectional view indicated by line 4 4 in the first figure.

Referring by letter to the drawings, A indicates fragments of a pair of endless belts, and B fragments of one of the slats that are connected at their ends to the belts to form a conveyer such as is common in threshing-machines, the connecting-clips herein shown being what I seek to cover as my invention.

Each clip is a strap of suitable metal centrally bent to form an outer loop $b$, with which a conveyer-belt is engaged, and barbs $c$, struck out at a right angle from the parallel portions of the loop, are embedded in the belt to hold said clip in place, it being preferable, as herein shown, to have the barbs extend alternately in opposite directions. The parallel end portions of the clip are preferably wider than the loop portion of the same, and their longitudinal edges are bent inward at right angles to form flanges $d$, that oppose sides of a slat B, connected by said clip to a belt. To compensate for the thickness of the slat, a portion of the clip is angularly bent to offset one of its flanged ends from the loop.

Struck up from one side of the clip is a tongue $e$, that extends through openings $f\ g$, with which the slat B and said clip are respectively provided. The exposed end of the tongue is struck down into another opening $h$ in the adjacent side of the clip over intervening metal $i$, between this opening and the one, $g$, aforesaid, the result being a rigid permanent connection of said clip and slat. The striking down of its exposed end of the tongue embeds the same to some extent in the adjacent slat, and there is a draw of said tongue to clamp the clip tight on said slat.

Having thus described my invention, what I claim as new, and desire to secure by Letters Patent, is—

A clip for connecting a belt and slat in an endless conveyer, this clip consisting of a single piece of suitable metal shaped to form a belt-loop and to have one of its ends offset from the loop but parallel to the other, barbs struck from the metal into the loop at right angles in opposite directions, flanges extending inward from said ends of the clip longitudinally of the same, a tongue struck up from one of the clip ends, and the other of said clip ends provided with adjacent openings with which the tongue is engaged subsequent to its engagement with a slat-opening.

In testimony that I claim the foregoing I I have hereunto set my hand, at Milwaukee, in the county of Milwaukee and State of Wisconsin, in the presence of two witnesses.

CHARLES RASMUSSEN.

Witnesses:
N. E. OLIPHANT,
ANDREW RASMUSSEN.